United States Patent
Wang et al.

(10) Patent No.: US 10,988,378 B2
(45) Date of Patent: Apr. 27, 2021

(54) PILOT PLANT FOR CHEMICAL LOOPING HYDROGEN GENERATION USING SINGLE-COLUMN PACKED BED AND HYDROGEN GENERATION METHOD

(71) Applicant: Tsinghua University, Beijing (CN)

(72) Inventors: Wei Wang, Beijing (CN); Xiuning Hua, Beijing (CN); Zhou Xia, Beijing (CN)

(73) Assignee: Tsinghua University, Beijing (CN)

( * ) Notice: Subject to any disclaimer, the term of this patent is extended or adjusted under 35 U.S.C. 154(b) by 2 days.

(21) Appl. No.: 15/625,738

(22) Filed: Jun. 16, 2017

(65) Prior Publication Data
US 2018/0002173 A1    Jan. 4, 2018

(30) Foreign Application Priority Data

Jun. 29, 2016  (CN) .......................... 201610500863.4

(51) Int. Cl.
*C01B 3/10*         (2006.01)
*B01J 8/06*         (2006.01)
(Continued)

(52) U.S. Cl.
CPC ............. *C01B 3/105* (2013.01); *B01J 8/0453* (2013.01); *B01J 8/0496* (2013.01); *B01J 8/06* (2013.01);
(Continued)

(58) Field of Classification Search
CPC .................................. C01B 3/32; C01B 3/105
See application file for complete search history.

(56) References Cited

U.S. PATENT DOCUMENTS 3,888,886 A * 6/1975 Young .................. C07C 51/215
                                                        549/260
6,589,303 B1 * 7/2003 Lokhandwala ...... B01D 53/229
                                                        423/650
(Continued)

FOREIGN PATENT DOCUMENTS

CN        202719764 U     2/2013
CN        103043616 A     4/2013
(Continued)

OTHER PUBLICATIONS

Reactor choices for chemical looping combustion (CLC)-Dependencies on materials characteristics. Erin Kimball et al. Energy Procedia, V37, pp. 567-574 (Year: 2013).*

(Continued)

*Primary Examiner* — Douglas B Call
(74) *Attorney, Agent, or Firm* — Muncy, Geissler, Olds & Lowe, P.C.

(57) ABSTRACT

A pilot plant for chemical looping hydrogen generation using a single-column packed bed and hydrogen generation method. The plant has a feeding system, reaction system, tail gas treatment and analysis system, and auxiliary system. The reaction system has a packed bed reactor, inside which a thermal storage layer, oxygen carrier layer and supporting layer are arranged successively from top to bottom. The feeding system has a delivery pipe, metering pump, mass flow controller and fuel mixer. The tail gas treatment and analysis system has a cooler, gas-liquid separator, mass flow meter, gas analyzer and tail gas pipe. The packed bed reactor is subjected to fuel reduction, purge, steam oxidation, purge, air combustion and purge stages successively under control of the feeding system. The pilot plant enables evaluation for oxygen carriers and identification for technological difficul- (Continued)

ties and can generate high-purity hydrogen without using complex gas purification devices.

12 Claims, 1 Drawing Sheet

(51) Int. Cl.
*C01B 3/32* (2006.01)
*B01J 8/04* (2006.01)

(52) U.S. Cl.
CPC .............. *B01J 8/065* (2013.01); *C01B 3/32* (2013.01); *B01J 2208/0007* (2013.01); *B01J 2208/00044* (2013.01); *B01J 2208/00061* (2013.01); *B01J 2208/00088* (2013.01); *Y02E 60/36* (2013.01)

(56) References Cited

U.S. PATENT DOCUMENTS

| | | | | |
|---|---|---|---|---|
| 2004/0081875 | A1* | 4/2004 | Milliken | C25B 1/02 429/469 |
| 2005/0175533 | A1* | 8/2005 | Thomas | C01B 3/063 423/657 |
| 2014/0087184 | A1* | 3/2014 | Choi | B01J 23/881 428/367 |
| 2015/0241056 | A1* | 8/2015 | Bollas | F23C 99/006 431/7 |
| 2015/0273427 | A1* | 10/2015 | Moonen | G05D 16/2095 436/55 |
| 2016/0002555 | A1* | 1/2016 | Brusletto | C10L 9/08 44/590 |
| 2016/0264883 | A1* | 9/2016 | Narayanaswamy | C10G 47/06 |

FOREIGN PATENT DOCUMENTS

| | | | |
|---|---|---|---|
| WO | 2014062056 | * | 4/2014 |
| WO | WO2014129910 | * | 8/2014 |
| WO | WO2016142806 | * | 9/2016 |

OTHER PUBLICATIONS

Hua et al., "The Behaviour of Multiple Reaction Fronts; Merging Temperature; Maximum Solid Conversion; Reduction Step; Iron-Based Oxygen Carrier," Applied Energy, 2017, 193, 59 pages.

Hua et al., "Performance and Kinetics of Iron-Based Oxygen Carriers Reduced by Carbon Monoxide for Chemical Looping Combustion," Frontiers of Environmental Sciene & Engineering, 2015, 9(6): pp. 1130-1138.

Hua et al., "Analysis of Reduction Stage of Chemical Looping Packed Bed Reactor Based on the Reaction Front Distribution," J. of Material Cycles and Waste Management, 2014, 16(4), pp. 583-590.

Hua et al., "Packed Bed Chemical Looping Platform: Design and Operation of 30kW$^{th}$ Pilot Unit," Procedia Environmental Sciences, 2016, 31: pp. 81-90.

Wang et al., "The Reduction Mechanism and Kinetics of $Fe_2O_3$ by Hydrogen for Chemical-Looping Hydrogen Generation," Journal of Thermal Analysis and Calorimetry, 2017, 129, pp. 1831-1838.

Zhu et al., "Stepwise Reudction Kinetics of Iron-Based Oxygen Carriers by $CO/CO_2$ Mixture Gases for Chemical Looping Hydrogen Generation," Journal of Mater Cycles Waste Management, 2017, 19(1), pp. 453-462.

Hu et al., "Preparation and Reactivity Performance of Iron-Based Oxygen Carriers Supported on Different Inert Carriers," Applied Chemical Industry, 2014, 43(6): pp. 979-981.

* cited by examiner

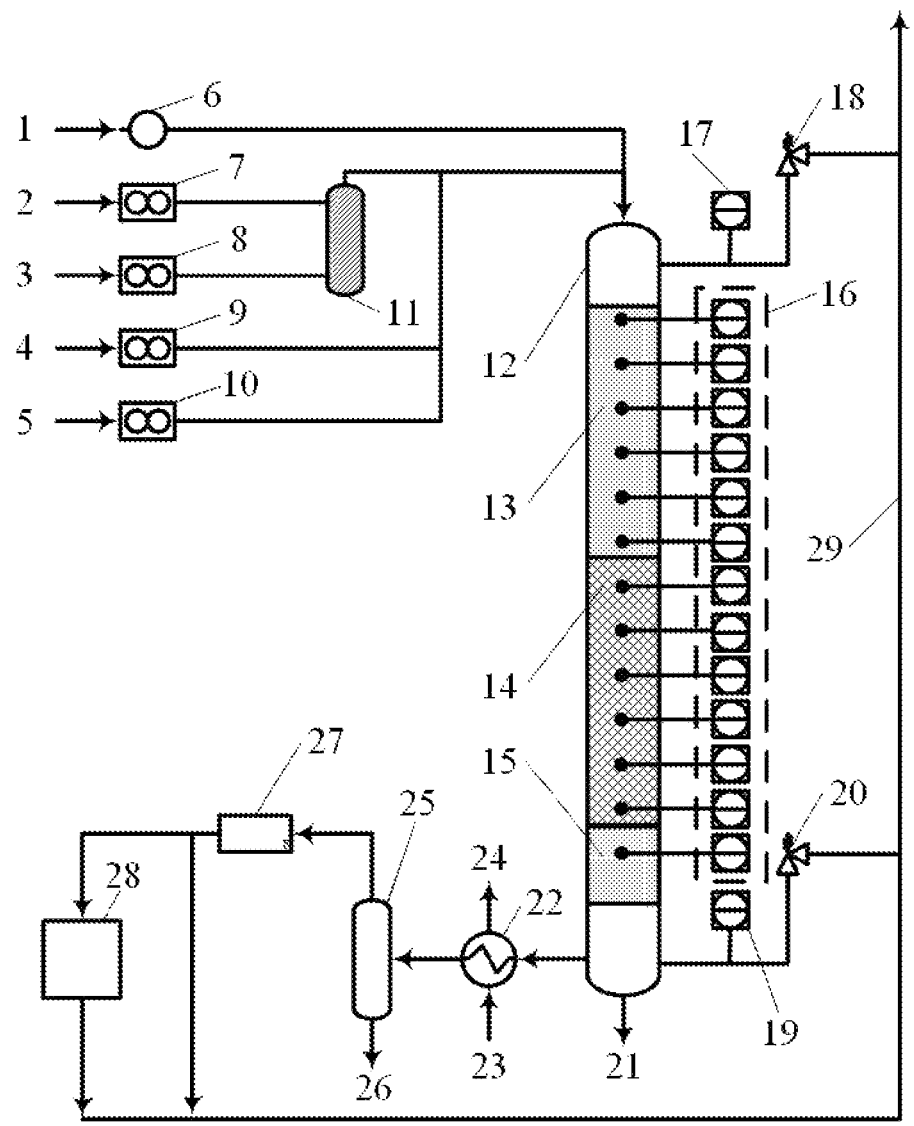

PILOT PLANT FOR CHEMICAL LOOPING HYDROGEN GENERATION USING SINGLE-COLUMN PACKED BED AND HYDROGEN GENERATION METHOD

TECHNICAL FIELD

The present invention belongs to the field of chemical looping hydrogen generation, and in particular relates to a pilot plant for chemical looping hydrogen generation using a single-column packed bed and a hydrogen generation method.

BACKGROUND ART

The current fossil fuel-based energy systems, while meeting the energy needs of economic and social development, have incurred severe regional and global environmental issues, among which a large amount of $CO_2$ emitted by fossil energy systems has resulted in an increase in $CO_2$ content in the atmosphere, an increase in the earth's average temperature, and severe global warming. In the meantime, $CO_2$ emission in large amounts also gives rise to ocean acidification, which gravely endangers the balance of natural ecosystems and imperils the survival of mankind.

As one of those clean low-carbon energies, hydrogen generates only water while utilized, without bringing any pollutant emissions and environmental damages. The existing hydrogen generation methods mainly include: electrolysis, natural gas reforming, coal gasification, high temperature water splitting, hydrogen generation from biomass, photolysis, biochemical processes and so on. Of all these methods, electrolysis, high temperature water splitting, photolysis and biochemical processes require stringent conditions for their hydrogen generation, while natural gas reforming, coal gasification, hydrogen generation from biomass and other such processes have relatively long process routes. As a consequence, these processes have relatively high costs for hydrogen generation.

Chemical looping hydrogen generation technique is a novel hydrogen generation technique that spatially separates fuel reduction, steam oxidation and air oxidation from each other by means of cyclic oxygen gain and loss of an iron-based oxygen carrier, and therefore enables internal separation of $CO_2$ while generating high-purity $H_2$. A typical chemical looping hydrogen generation cycle goes as follows: a fuel reacts with an iron-based oxygen carrier ($Fe_2O_3$) in a fuel reactor and whereby is obtained oxygen to be oxidized into $CO_2$ and $H_2O(g)$, and this product is subjected to water removal by condensation to obtain pure $CO_2$, the reduced iron-based oxygen carrier (FeO/Fe) enters a steam reactor where it is oxidized by steam, with the resultant product, the water of which is removed by condensation, being high-purity $H_2$; the steam-oxidized iron-based oxygen carrier ($Fe_3O_4$) enters an air reactor where it is further oxidized by air and thus completely regenerated, and simultaneously a great amount of heat is released and the generated high-temperature flue gas can be used for heat supply and power generation. It is obvious that this hydrogen generation process flow is simple, no complex gas separation device is required and the costs for hydrogen generation are low. Furthermore, due to the fact that lattice oxygen in the oxygen carrier is utilized for oxidative combustion of the fuel, this chemical looping hydrogen generation technique is also featured by low $NO_x$ and dioxin emissions, making the resulting $H_2$ cleaner.

Being a critical component in the chemical looping hydrogen generation technique, reactors need to convert the iron-based oxygen carrier to states below $Fe_3O_4$ on the premise of guaranteeing complete fuel conversion, and only in this way can it be ensured that the iron-based oxygen carrier generates hydrogen at the steam oxidation stage. Fluidized bed reactors are a reactor form widely applied in chemical looping combustion. Due to the presence of completely stirred flow operations, the iron-based oxygen carrier has a maximal solid phase conversion rate of 11%, which corresponds to $Fe_3O_4$, in case of guaranteeing complete fuel conversion. It is impossible for this reduced iron-based oxygen carrier to be oxidized to generate hydrogen at the steam oxidation stage, suggesting that those completely stirred flow-type fluidized bed reactors cannot be applied to the chemical looping hydrogen generation technique. It is likely that plug-flow-operated packed bed reactors reduce the iron-based oxygen carrier to states below $Fe_3O_4$ while guaranteeing complete fuel conversion, and it is thus ensured that the reduced iron-based oxygen carrier is capable of producing hydrogen at the steam reduction stage. At present, on the condition that complete fuel combustion is guaranteed, packed bed reactors have a solid phase conversion rate of 20% to 30% at the fuel reduction stage. Nevertheless, the current packed bed reactors are substantially operated at a laboratory scale, and reports on large-scale implementations have not yet been seen. And yet implementation of the large-scale packed bed chemical looping hydrogen generation technique is vital to examining technical performances, evaluating oxygen carriers and ascertaining technical difficulties.

SUMMARY OF THE INVENTION

In view of the problems existing in the prior art, the present invention is to provide a pilot plant for chemical looping hydrogen generation using a single-column packed bed and a hydrogen generation method, through which the chemical looping hydrogen generation technique is implemented at a larger scale and conditions are provided for evaluation for oxygen carriers and identification for technological difficulties.

The technical solution adopted by the present invention is as follows.

In a first aspect, a pilot plant for chemical looping hydrogen generation using a single-column packed bed comprises a feeding system, a reaction system and a tail gas treatment and analysis system.

The feeding system comprises at least one raw material delivery pipe, at least one raw material mass flow controller and a fuel mixer, at least one outlet of the raw material mass flow controller is connected with the inlet of the fuel mixer, and other remaining outlets of the raw material mass flow controller are connected with the inlet of the reaction system.

The reaction system is composed of a packed bed reactor, inside which a thermal storage layer, an oxygen carrier layer and a supporting layer are arranged successively from top to bottom, and the packed bed reactor is continuously subjected to fuel reduction, first purge, steam oxidation, second purge, air combustion and third purge stages successively under the control of the feeding system.

The tail gas treatment and analysis system comprises a cooler, a gas-liquid separator, a mass flow meter, a gas analyzer and a tail gas pipe, and these components are successively connection one by one, by the former's outlet to the follower's inlet.

In combination with the first aspect and in a first possible implementation, the raw material mass flow controller comprises a metering pump, at least one fuel mass flow controller, an air mass flow controller and a nitrogen mass flow controller. The metering pump, the air mass flow controller and the nitrogen mass flow controller are each connected with the inlet of the reaction system, and the outlet of the fuel mass flow controller is connected with the inlet of the mixing reactor.

In combination with the first aspect and in a second possible implementation, the oxygen carrier layer of the packed bed reactor has a length-to-diameter ratio of 4:1 to 12:1.

In combination with the second possible implementation and in a third possible implementation, a packed bed reactor inlet safety valve and a packed bed reactor outlet safety valve are connected with the tail gas pipe, and a packed bed reactor blowdown pipe is provided at the bottom of the packed bed reactor.

In combination with the third possible implementation and in a fourth possible implementation, the internal temperature of the packed bed reactor is measured by a packed bed reactor axial temperature measurement device, and the pressure drop of the packed bed reactor is measured by a packed bed reactor inlet pressure sensor and a packed bed reactor outlet pressure sensor.

In combination with any of the first to fourth possible implementations and in a fifth possible implementation, the plant further comprises an auxiliary system connected with the feeding system, the reaction system and the tail gas treatment and analysis system, respectively, and the auxiliary system comprises a quartz heating furnace, a pilot plant control apparatus and an electrical apparatus.

In combination with the fifth possible implementation and in a sixth possible implementation, the packed bed reactor has a reaction temperature of 700° C. to 1100° C. at the fuel reduction stage, a reaction temperature of 700° C. to 1100° C. at the steam oxidation stage, and a reaction temperature of 700° C. to 1100° C. at the air combustion stage.

In a second aspect, a method for chemical looping hydrogen generation in combination with any of the first to sixth possible implementations is characterized by comprising the following steps:

A. feeding stage: the feeding system mixes a fuel I with a fuel II via the fuel mixer and then delivers the mixture into the packed bed reactor of the reaction system, and other raw materials are delivered into the packed bed reactor of the reaction system after passing through the corresponding raw material mass flow controllers.

B. reaction stage: the mixed fuels I and II react with an oxygen carrier in the packed bed reactor and other raw materials enter the packed bed reactor successively under the control of the feeding system, so that the packed bed reactor is subjected to the fuel reduction stage, the first purge stage, the steam oxidation stage, the second purge stage, the air combustion stage and the third purge stage successively.

C. the tail gas treatment stage: gases generated during the fuel reduction stage, the steam oxidation stage and the air combustion stage are cooled, separated, metered and analyzed by the tail gas treatment and analysis system before being discharged.

In combination with the second aspect and in a first possible implementation, the gas generated during the steam oxidation stage is cooled and separated by the tail gas treatment and analysis system to obtain high-purity hydrogen, which is metered and analyzed before being discharged.

In combination with the first possible implementation and in a second possible implementation, the reaction temperatures of the fuel reduction stage, the steam oxidation stage and the air combustion stage are 800° C.; and the gases of the first purge stage, the second purge stage and the third purge stage are nitrogen.

Compared with the prior art, the pilot plant for chemical looping hydrogen generation using a single-column packed bed and the hydrogen generation method, provided in the present invention, realize the technical effects that follow.

1) The process flow is simplified in which high-purity $H_2$ can be obtained by simple condensation and water removal of the $H_2$ product generated by a chemical looping hydrogen generation unit, without using complex gas purification device. Thus, the costs for hydrogen generation are low.

2) Internal separation of $CO_2$ is enabled at the same time of hydrogen generation, resulting in lower carbon during the hydrogen generation procedure.

3) Implementation of the chemical looping hydrogen generation technique on a large-scale reactor helps evaluate oxygen carriers and identify technological difficulties, while at the same time offering a pilot test data support for large-scale application of these techniques.

4) Purging is carried out at different reaction stages of hydrogen generation to prevent dangers caused by mixing of the gases from different stages and also protect product purity from being affected.

5) In the event that nitrogen is employed as a purge gas for hydrogen generation, temperature within the packed bed reactor can be regulated without any chemical reaction with the gases since nitrogen is inert.

BRIEF DESCRIPTION OF THE DRAWINGS

The sole FIGURE is a schematic diagram of a pilot plant for chemical looping hydrogen generation using a single-column packed bed in accordance with embodiment 1.

DETAILED DESCRIPTION OF THE INVENTION

The procedure and effect of the inventive method will be further described below in conjunction with the embodiments that are not intended to limit the patent scope of the present invention. Any equivalent implementation or change made without departing from the present invention shall be included within the scope of the present patent.

Embodiment 1

As shown in the sole FIGURE, provided in this embodiment is a pilot plant for chemical looping hydrogen generation using a single-column packed bed, which comprises a feeding system, a reaction system, a tail gas treatment and analysis system, and an auxiliary system, wherein the feeding system comprises: a water delivery pipe 1, a fuel I delivery pipe 2, a fuel II delivery pipe 3, a nitrogen delivery pipe 4, an air delivery pipe 5, a metering pump 6, a fuel I mass flow controller 7, a fuel II mass flow controller 8, a nitrogen mass flow controller 9, an air mass flow controller 10 and a fuel mixer 11.

The reaction system comprises a packed bed reactor 12, a thermal storage layer 13, an oxygen carrier layer 14, a supporting layer 15, a packed bed reactor axial temperature measurement device 16, a packed bed reactor inlet pressure sensor 17, a packed bed reactor inlet safety valve 18, a packed bed reactor outlet pressure sensor 19, a packed bed reactor outlet safety valve 20, and a packed bed reactor blowdown pipe 21.

The tail gas treatment and analysis system comprises a cooler 22, a circulated cooling water inlet pipe 23, a circulated cooling water outlet pipe 24, a gas-liquid separator 25, a condensed water outlet pipe 26, a mass flow meter 27, a gas analyzer 28 and a tail gas pipe 29.

The plant further comprises an auxiliary system, which is connected with the feeding system, the reaction system and the tail gas treatment and analysis system, respectively, and provides auxiliary apparatuses, such as electrical, heating and control apparatuses. The auxiliary system comprises a quartz heating furnace, a pilot plant control apparatus and an electrical apparatus. The quartz heating furnace provides appropriate reaction temperatures for different reaction stages in the reaction system; and the pilot plant control apparatus serves to control coordinated reactions among the various systems, in order to compare different experimental results.

Fuels in the fuel I delivery pipe 2 and the fuel II delivery pipe 3 enter the fuel mixer 11 respectively via the fuel I mass flow controller 7 and the fuel II mass flow controller 8, the outlet of the fuel mixer 11 is connected with the inlet of the packed bed reactor 12; and the water delivery pipe 1, the nitrogen delivery pipe 4 and the air delivery pipe 5 are connected with the inlet of the packed bed reactor 12 respectively via the metering pump 6, the nitrogen mass flow controller 9 and the air mass flow controller 10.

The packed bed reactor 12 has the thermal storage layer 13, the oxygen carrier layer 14 and the supporting layer 15 arranged therein successively from top to bottom, the oxygen carrier layer 14 of the packed bed reactor 12 has a length-to-diameter ratio of 4:1 to 12:1, and such a ratio relationship makes it possible to attain optimal contact areas between oxygen carrier and fuel gas and air and also achieve the largest reaction space and best reaction effect; the temperature within the packed bed reactor 12 is measured by the packed bed reactor axial temperature measurement device 16; the pressure drop of the packed bed reactor 12 is determined by the packed bed reactor inlet pressure sensor 17 and the packed bed reactor outlet pressure sensor 19; the packed bed reactor inlet safety valve 18 and the packed bed reactor outlet safety valve 20 are connected with the tail gas pipe 29; and the bottom of the packed bed reactor 12 is connected with the packed bed reactor blowdown pipe 21.

The packed bed reactor 12 is internally structured in such a manner that the thermal storage layer 13, the oxygen carrier layer 14 and the supporting layer 15 are arranged successively from top to bottom. The temperatures of fuel gas, water and air can be raised to appropriate reaction temperatures, followed by reacting with the oxygen carrier. Thus reaction efficiency is enhanced due to the seamless transition from the heating procedure to the reaction procedure.

Preferably, the packed bed reactor 12 has an inner diameter of 79 mm and is made of 310s stainless steel. The thermal storage layer 13 is loaded with 3 kg of inert alumina balls having a diameter of 10 mm, with the aim of vaporizing liquid water. Also, the supporting layer 15 is loaded with 3 kg of inert alumina balls having a diameter of 10 mm, for ensuring that the oxygen carrier layer 14 is located in a constant temperature area in the middle of the packed bed reactor 12. The oxygen carrier used is cylindrical $Fe_2O_3/Al_2O_3$ having a diameter of 5 mm and a height of 4-6 mm, with the loading being 4 kg.

The outlet of the packed bed reactor 12 is connected with the material inlet of the cooler 22, the cooling water inlet and outlet of the cooler 22 are connected with the circulated cooling water inlet pipe 23 and the circulated cooling water outlet pipe 24, respectively; the material outlet of the cooler 22 is connected with the inlet of the gas-liquid separator 25, the condensed water outlet of the gas-liquid separator 25 is connected with the condensed water outlet pipe 26, the gas outlet of the gas-liquid separator 25 is connected with the inlet of the mass flow meter 27; the outlet of the mass flow meter 27 is connected with the inlet of the gas analyzer 28 and with the tail gas pipe 29, and the outlet of the gas analyzer 28 is connected with the tail gas pipe 29.

Wherein the packed bed reactor has a reaction temperature of 700° C. to 1100° C. at the fuel reduction stage, a reaction temperature of 700° C. to 1100° C. at the steam oxidation stage, and a reaction temperature of 700° C. to 1100° C. at the air combustion stage.

Under the control of the feeding system, the packed bed reactor 12 is continuously subjected to the fuel reduction stage, the first purge stage, the steam oxidation stage, the second purge stage, the air combustion stage and the third purge stage successively, so as to finish a complete chemical looping hydrogen generation procedure. The oxygen carrier in the packed bed reactor 12 undergoes cyclic oxygen gain and loss during the complete chemical looping hydrogen generation procedure, thereby producing nitrogen.

According to the pilot plant for chemical looping hydrogen generation using a single-column packed bed provided in the embodiment of the present invention, the process flow is simplified in which high-purity $H_2$ can be obtained by simple condensation and water removal of the $H_2$ product generated by a chemical looping hydrogen generation unit, without using any complex gas purification device. Thus, the costs for hydrogen generation are low. The arrangement of the tail gas treatment and analysis system enables internal separation of $CO_2$ at the same time of hydrogen generation, resulting in lower carbon during the hydrogen generation procedure. Implementation of the chemical looping hydrogen generation technique on a large-scale reactor is conducive to evaluation for oxygen carriers and identification for technological difficulties, while at the same time offering a pilot test data support for large-scale application of the technique.

Embodiment 2

As shown in the sole FIGURE, provided in this embodiment is a method for hydrogen generation by applying the pilot plant for chemical looping hydrogen generation using a single-column packed bed, which specifically comprises the following steps.

A. feeding stage: the feeding system mixes a fuel I with a fuel II via the fuel mixer and then delivers the mixture into the packed bed reactor of the reaction system, and other raw materials are delivered into the packed bed reactor of the reaction system after passing through the corresponding raw material mass flow controllers.

B. reaction stage: the mixed fuels I and II react with an oxygen carrier in the packed bed reactor and other raw materials enter the packed bed reactor successively under the control of the feeding system, so that the packed bed reactor is subjected to the fuel reduction stage, the first purge stage, the steam oxidation stage, the second purge stage, the air combustion stage and the third purge stage successively.

C. the tail gas treatment stage: gases generated during the fuel reduction stage, the steam oxidation stage and the air combustion stage are cooled, separated, metered and analyzed by the tail gas treatment and analysis system before being discharged.

Specifically in step A, CO from the fuel I delivery pipe 2 and $H_2$ from the fuel II delivery pipe 3 enter the packed bed reactor 12 after being uniformly mixed by the fuel mixer 11, and the oxygen carrier reacts with the mixed fuels I and II at a temperature of 800° C.

In step B, upon the completion of reduction of the fuels I and II and the oxygen carrier, the fuel I mass flow controller 7 and the fuel II mass flow controller 8 are closed, the nitrogen mass flow controller 9 is opened, nitrogen that comes from the nitrogen delivery pipe 4 enters the packed bed reactor 12, and the gas from the fuel reduction stage is purged for the first time. Wherein the first purge is aimed at guaranteeing no impact of the fuel gas on hydrogen purity.

Wherein preferably, the packed bed reactor 12 has an inner diameter of 79 mm and is made of 310s stainless steel. The packed bed reactor 12 has the thermal storage layer 13, the oxygen carrier layer 14 and the supporting layer 15 arranged therein successively from top to bottom. The thermal storage layer 13 is loaded with 3 kg of inert alumina balls having a diameter of 10 mm, with the aim of vaporizing liquid water. Also, the supporting layer 15 is loaded with 3 kg of inert alumina balls having a diameter of 10 mm, for ensuring that the oxygen carrier layer 14 is located in a constant temperature area in the middle of the packed bed reactor 12. The oxygen carrier used is cylindrical $Fe_2O_3/Al_2O_3$ having a diameter of 5 mm and a height of 4-6 mm, with the loading being 4 kg. And the corresponding length-to-diameter ratio of the oxygen carrier layer is 6:1.

After purge is concluded, the nitrogen mass flow control valve 9 is closed, the metering pump 6 is opened, liquid water coming from the water delivery pipe 1 enters the packed bed reactor 12 and then is vaporized on the scorching thermal storage layer 13, and the steam that is quantified in a precise way reacts with the reduced oxygen carrier at a temperature of 800° C.

When the steam oxidation is concluded, the metering pump 6 is closed, the nitrogen mass flow control valve 9 is opened, nitrogen from the nitrogen delivery pipe 4 enters the packed bed reactor 12, and the gas from the steam oxidation stage is purged for the second time. Wherein the second purge is to guarantee no impact of the fuel gas on hydrogen purity. Upon the completion of purge, the nitrogen mass flow control valve 9 is closed, the air mass flow controller 10 is opened, and air from the air delivery pipe 5 enters the packed bed reactor 12 and reacts with the steam-oxidized oxygen carrier at a temperature of 800° C.

When air combustion comes to an end, the air mass flow controller 10 is closed, the nitrogen mass flow control valve 9 is opened, nitrogen from the nitrogen delivery pipe 4 enters the packed bed reactor 12, the gas from the air combustion stage is purged for the third time, and in this way a complete chemical looping hydrogen generation cycle is done. Wherein the third purge is intended to avoid explosion that occurs after air is mixed with the fuel from the reduction stage.

It should be noted that steam oxidation is capable of oxidizing the iron-based oxygen carrier only into $Fe_3O_4$, which fails to combust the fuel gas completely at the reduction stage as there exists thermodynamic limitations. In order to achieve complete fuel combustion and improve process efficiency while enabling internal separation of carbon dioxide, the air combustion stage needs to be added to further oxidize the steam-oxidized iron-based oxygen carrier into $Fe_2O_3$.

In step C, $CO_2$ and $H_2O(g)$ generated during the fuel reduction stage are cooled in the cooler 22 until water is condensed, then enter the gas-liquid separator 25 to remove the condensed water, and are metered by the mass flow meter 27 and subsequently divided into two paths, one of which enters the tail gas pipe 29 directly, and the other of which firstly enters the gas analyzer 28 for gas composition analysis and then makes its way into the tail gas pipe 29.

$H_2$ and $H_2O(g)$ generated by the reaction during the steam oxidation stage is cooled by the cooler 22 and then subjected to water removal in the gas-liquid separator 25 to obtain high-purity $H_2$, and the $H_2$ product is metered by the mass flow meter 27 and analyzed by the gas analyzer 28 before entering the tail gas pipe 29.

The gas generated by the reaction during the air combustion stage is cooled by the cooler 22, water-removed by the gas-liquid separator 25, metered by the mass flow meter 27 and analyzed by the gas analyzer 28 before entering the tail gas pipe 29.

The reactant flows as well as the results of packed bed chemical looping hydrogen generation pilot test in embodiment 2 are listed in Table 1.

TABLE 1

Implementation conditions and results of pilot plant for chemical looping hydrogen generation using packed bed

| Implementation conditions | | | | |
|---|---|---|---|---|
| CO flow | $H_2$ flow | Steam flow | Nitrogen flow | Air flow |
| 7.5 L/min | 7.5 L/min | 30 g/min | 15 L/min | 15 L/min |

| Implementation results | | |
|---|---|---|
| $H_2$ content | CO content | $CO_2$ content |
| 98.3% | 0.4% | 1.3% |

Experimental data has demonstrated that high-purity hydrogen can be obtained under the above-mentioned implementation conditions, and the entire hydrogen generation procedure becomes more environmentally friendly since the content of carbon dioxide is dramatically reduced after treatments.

According to the method for hydrogen generation provided in the embodiment of the method, the process flow is simplified, the hydrogen generated has high purity and can be obtained only through condensation, there is no complex gas purification procedure, and thus the costs for hydrogen generation are low. Internal separation of carbon dioxide during the process of reaction can be completed at the same time of high-purity hydrogen generation, leading to lower carbon and better environmental friendliness during the hydrogen generation procedure. The chemical looping hydrogen generation technique can be implemented on a large-scale reactor to offer a pilot test data support for large-scale application. The air combustion stage enables a sufficient reduction of the iron-based oxygen carrier while achieving internal separation of carbon dioxide, and therefore complete fuel combustion and an improvement in efficiency are both accomplished.

The above description illustrates and describes several preferred embodiments of the present invention, but as previously described, it is to be understood that the present invention is not limited to the forms disclosed herein, and that the present invention shall not be considered as excluding other embodiments, and instead can be used in various other combinations, modifications and environments and is capable of modifications within the scope of the inventive concept as expressed herein by the above teaching or techniques or knowledge in related arts. Any modifications and changes made by those skilled in the art that do not depart from the spirit and scope of the present invention shall fall within the scope of the appended claims of the present invention.

The invention claimed is:

1. A method for chemical looping hydrogen generation using a pilot plant, wherein the method comprises following steps:
   A. feeding stage: a feeding system mixes a fuel I with a fuel II via a fuel mixer and then delivers the mixture into a packed bed reactor of a reaction system, and other raw materials are delivered into the packed bed reactor of the reaction system after passing through corresponding raw material mass flow controllers;
   B. reaction stage: mixed fuels I and II react with an oxygen carrier in the packed bed reactor and other raw materials enter the packed bed reactor successively under a control of the feeding system, so that the packed bed reactor is subjected to a fuel reduction stage, a first purge stage, a steam oxidation stage, a second purge stage, an air combustion stage and a third purge stage successively, wherein liquid water enters the packed bed reactor after the first purge stage; and
   C. tail gas treatment stage: gases generated during the fuel reduction stage, the steam oxidation stage and the air combustion stage are cooled, separated, metered and analyzed by a tail gas treatment and analysis system before being discharged.

2. The method according to claim 1, wherein gas generated during the steam oxidation stage is cooled and separated by a tail gas treatment and analysis system to obtain high-purity hydrogen, which is metered and analyzed before being discharged, wherein the high-purity hydrogen comprises at least 98.3% of hydrogen.

3. The method according to claim 2, wherein reaction temperatures of the fuel reduction stage, the steam oxidation stage and the air combustion stage are 800° C.; and gases of the first purge stage, the second purge stage and the third purge stage are nitrogen.

4. The method according to claim 1, wherein the pilot plant comprises a raw material mass flow controller comprising a metering pump, a fuel I mass flow controller and a fuel II mass flow controller, an air mass flow controller and a nitrogen mass flow controller, wherein the metering pump, the air mass flow controller and the nitrogen mass flow controller are each connected to the inlet of the reaction system, and an outlet of the fuel I mass flow controller and an outlet of the fuel II mass flow controller are connected to an inlet of the fuel mixer.

5. The method according to claim 1, wherein a thermal storage layer, an oxygen carrier layer and a supporting layer are arranged successively from top to bottom inside the packed bed reactor, and wherein said liquid water entering the packed bed reactor is then vaporized on the thermal storage layer.

6. The method according to claim 5, wherein the oxygen carrier layer of the packed bed reactor has a length-to-diameter ratio of 4:1 to 12:1.

7. The method according to claim 1, wherein the tail gas treatment and analysis system comprises a cooler, a gas-liquid separator, a mass flow meter, a gas analyzer and a tail gas pipe in successively connection.

8. The method according to claim 7, wherein a packed bed reactor inlet safety valve and a packed bed reactor outlet safety valve are connected with the tail gas pipe, and a packed bed reactor blowdown pipe is provided at a bottom of the packed bed reactor.

9. The method according to claim 1, wherein an internal temperature of the packed bed reactor is measured by a packed bed reactor axial temperature measurement device, and a pressure drop of the packed bed reactor is measured by a packed bed reactor inlet pressure sensor and a packed bed reactor outlet pressure sensor.

10. The method according to claim 1, wherein the feeding system comprises at least one raw material delivery pipe, at least one raw material mass flow controller and the fuel mixer, and wherein at least one outlet of the raw material mass flow controller is connected with an inlet of the fuel mixer, and other remaining outlets of the raw material mass flow controller are connected with an inlet of the reaction system.

11. The method according to claim 10, wherein the tail gas treatment and analysis system comprises a cooler, a gas-liquid separator, a mass flow meter, a gas analyzer and a tail gas pipe in successively connection, and
   wherein the pilot plant further comprises an auxiliary system that is connected with the feeding system, the reaction system and the tail gas treatment and analysis system, respectively, wherein the auxiliary system comprises a quartz heating furnace, a pilot plant control apparatus and an electrical apparatus.

12. The method according to claim 1, wherein the packed bed reactor has a reaction temperature of 700° C. to 1100° C. at the fuel reduction stage, a reaction temperature of 700° C. to 1100° C. at the steam oxidation stage, and a reaction temperature of 700° C. to 1100° C. at the air combustion stage.

* * * * *